(12) United States Patent
La Rosa et al.

(10) Patent No.: US 12,218,594 B2
(45) Date of Patent: Feb. 4, 2025

(54) CONTROL DEVICE FOR A SWITCHING VOLTAGE REGULATOR AND CONTROL METHOD

(71) Applicant: STMicroelectronics S.r.l., Agrate Brianza (IT)

(72) Inventors: Manuela La Rosa, Gravina di Catania (IT); Giovanni Sicurella, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 120 days.

(21) Appl. No.: 16/988,379

(22) Filed: Aug. 7, 2020

(65) Prior Publication Data

US 2021/0050787 A1 Feb. 18, 2021

(30) Foreign Application Priority Data

Aug. 13, 2019 (IT) .................. 102019000014715

(51) Int. Cl.
*H02M 3/158* (2006.01)
*G05F 1/56* (2006.01)

(52) U.S. Cl.
CPC ............ *H02M 3/1582* (2013.01); *G05F 1/56* (2013.01)

(58) Field of Classification Search
CPC ............ H02M 3/02; H02M 3/04; H02M 3/10; H02M 3/135; H02M 3/137; H02M 3/139; H02M 3/142; H02M 3/145; H02M 3/155; H02M 3/1552; H02M 3/156; H02M 3/1566; H02M 3/157; H02M 3/158; H02M 3/1582; H02M 3/1588; H02M 1/0009; H02M 1/0025; H02M 1/08; H02M 1/088;
(Continued)

(56) References Cited

U.S. PATENT DOCUMENTS

| 7,248,030 B2 * | 7/2007 | Yoshino | .............. | H02M 3/1582 323/284 |
| 9,337,730 B2 * | 5/2016 | Hoshino | .............. | H02M 3/157 |

(Continued)

FOREIGN PATENT DOCUMENTS

| CN | 102694469 A | * | 9/2012 |
| CN | 206389107 U | | 8/2017 |

(Continued)

OTHER PUBLICATIONS

English translation of CN-102694469-A. (Year: 2012).*

*Primary Examiner* — Thienvu V Tran
*Assistant Examiner* — Carlos O Rivera-Perez
(74) *Attorney, Agent, or Firm* — Slater Matsil, LLP (57) ABSTRACT

A control circuit and method, wherein an error signal is generated representative of a difference between an output voltage of a switching circuit and a nominal signal; a single control signal is generated, representative of an average error of the error signal; the single control signal is compared with a first periodic reference signal and a second periodic reference signal; a first pulse width modulated signal is generated by a Buck modulator; and a second pulse width modulated signal is generated by a Boost modulator. The maximum value of the first periodic reference signal and the minimum value of the second periodic reference signal are higher and lower, respectively, than the single control signal in a transient control mode between a Buck control mode and a Boost control mode.

15 Claims, 7 Drawing Sheets

(58) Field of Classification Search
CPC ... G05F 1/46; G05F 1/461; G05F 1/56; G05F 1/565; G05F 1/62
USPC ........ 323/223–226, 259, 266, 271–275, 277, 323/280, 282–285, 351
See application file for complete search history.

(56) References Cited

U.S. PATENT DOCUMENTS

| | | | |
|---|---|---|---|
| 9,678,521 B2* | 6/2017 | Liu | H02M 3/156 |
| 9,698,674 B1 | 7/2017 | Cherkassky et al. | |
| 2003/0052654 A1 | 3/2003 | Kanakubo et al. | |
| 2006/0238182 A1 | 10/2006 | Yoshino | |
| 2010/0019745 A1 | 1/2010 | Keskar et al. | |
| 2010/0045254 A1* | 2/2010 | Grant | H02M 3/1582 |
| | | | 323/283 |
| 2011/0043172 A1 | 2/2011 | Dearn | |
| 2012/0032658 A1 | 2/2012 | Casey et al. | |
| 2013/0307508 A1 | 11/2013 | Hallak | |
| 2016/0248325 A1 | 8/2016 | Tajima | |
| 2017/0288550 A1 | 10/2017 | Park et al. | |
| 2018/0034403 A1* | 2/2018 | Kim | F25B 49/025 |
| 2018/0041126 A1* | 2/2018 | Zhang | H02M 3/1582 |

FOREIGN PATENT DOCUMENTS

| | | |
|---|---|---|
| CN | 107534387 A | 1/2018 |
| CN | 215682135 U | 1/2022 |
| EP | 1837983 A1 | 9/2007 |
| JP | 2000166223 A | 6/2000 |

\* cited by examiner

CONTROL DEVICE FOR A SWITCHING VOLTAGE REGULATOR AND CONTROL METHOD

CROSS-REFERENCE TO RELATED APPLICATIONS

This application claims the benefit of Italian Application No. 102019000014715, filed on Aug. 13, 2019, which application is hereby incorporated herein by reference.

TECHNICAL FIELD

The present invention relates to a control device for a switching voltage regulator and a control method.

BACKGROUND

As known, switching voltage regulators work according to different schemes, the most widespread being buck (reducer or step-down) and boost (elevator or step-up) control modes. Also known are regulators (so-called buck-boost) which use both control modes in different operating phases of the regulator, depending on the value of the input voltage and, in particular, on the relationship (higher or lower) of the input voltage with respect to the output voltage.

Figure 1:
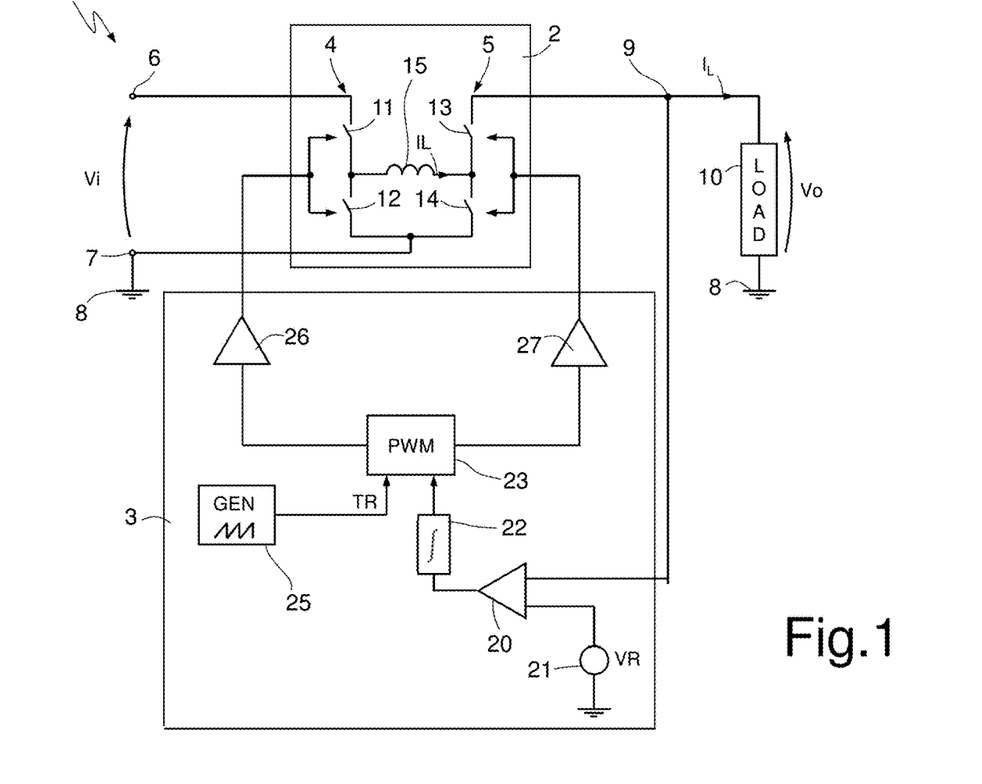
FIG. 1 is a block diagram of a known switching voltage regulator, including a switching circuit.

Switching voltage regulators of this type are based on the regulation of the duty cycle, that is of the on and off time of the switches and may be represented by a common block diagram, shown in FIG. 1.

The voltage regulator 1 of FIG. 1 comprises a switching circuit 2 and a control device 3.

The switching circuit 2 is here formed by first and second half-bridges 4, 5. The first half-bridge 4 is formed by a first high side switch (first HSS 11) and a first low side switch (first LSS 12), coupled in series to each other between first and second input terminals 6, 7. An input voltage Vi is applied between the first and second input terminals 6, 7; the second terminal 7 is coupled to a reference potential line (ground) 8.

The second half-bridge 5 is formed by a second high side switch (second HSS 13) and a second low side switch (second LSS 14), coupled in series to each other between an output node 9 and the second input terminal 7. An output voltage Vo, referred to ground, is present on the output node 9 and supplied to a load 18.

An inductor 15 is coupled between intermediate nodes of the first and second half-bridge 4, 5.

The control device 3 comprises an error amplifier 20 having inputs coupled to the output node 9 and a reference voltage source 21, which supplies a reference voltage VR. The error amplifier 20, for example an operational amplifier, compares the output voltage Vo (or a partition thereof) with the reference voltage VR and outputs an error signal which is integrated by an integrator stage 22 (for example an RC circuit not shown) and supplied to a pulse width modulator (PWM modulator 23).

The PWM modulator 23 also receives a triangular (or saw-tooth) signal TR generated by a triangular signal generator 25 and generates switching signals which, through respective driving circuits 26, 27, are used to control turning on and off of the switches 11-13, based on the type of control used. In particular, the modulator 23 generates rectangular (on-off) switching signals for the switches 11-13 based on the time instant when the triangular signal TR is equal to the integrated error signal.

In this circuit, the triangular signal generator 25 determines the working frequency of the voltage regulator 1 and the PWM modulator 23 determines the duration of the rectangular pulses and therefore the duty cycle of the voltage regulator 1.

Figure 2:
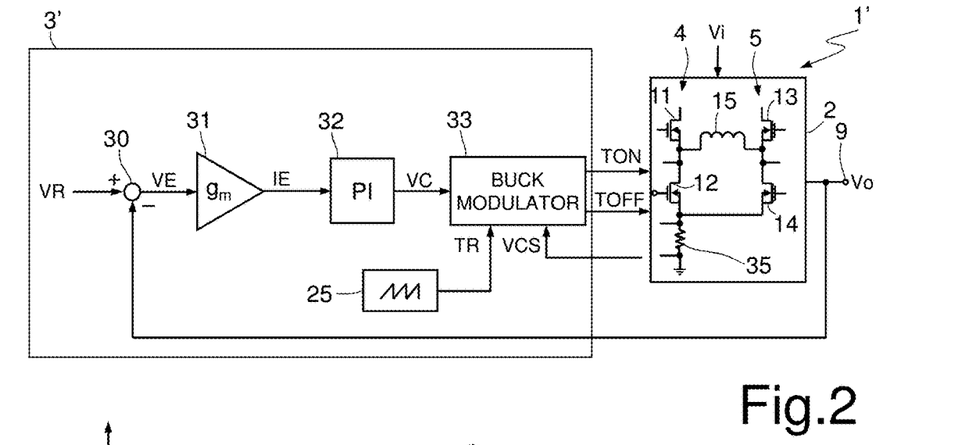
FIG. 2 is a circuit diagram of a Buck voltage regulator.
Figure 3:
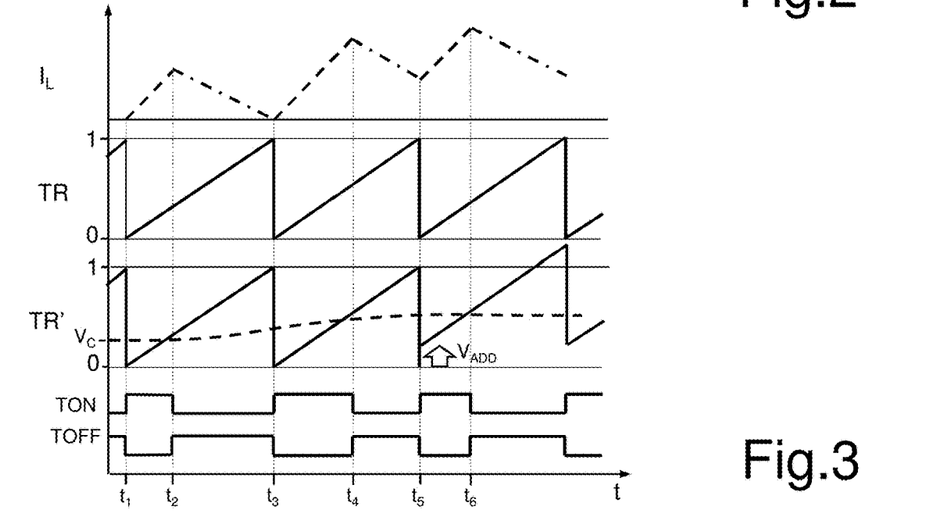
FIG. 3 shows the plot of some electrical quantities in the circuit of FIG. 2.
Figure 4:
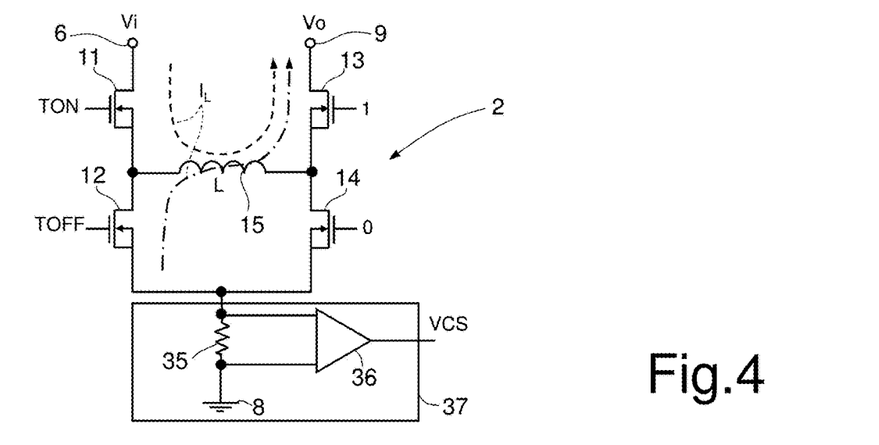
FIG. 4 shows the current flow in the switching circuit for the Buck regulator of FIG. 2.

For example, FIGS. 2, 3, 4 refer to a buck-type control implemented by a control device 3'. In particular, in FIG. 2, the error amplifier 20 of FIG. 1 is implemented by a subtracting node 30 (generating an error voltage signal VE) and by a transconductance amplifier 31 (generating an error current signal IE); the integrator stage 22 of FIG. 1 is implemented by a proportional-integral controller 32 (generating a voltage control signal VC) and the PWM modulator is implemented by a Buck modulator 33, receiving the triangular signal TR having a period T and generating a first switching signal TON and a second switching signal TOFF that are opposite to each other, as described below. In the switching circuit 2, the switches 11-14 are implemented by N-channel MOSFET transistors, identified by the same reference numbers as the switches 11-14 of FIG. 1. The switching circuit 2 further comprises a sensing resistor 35 coupled between the second LSS 12, 14 and ground and an amplifier 36 (FIG. 4), having inputs coupled across the sensing resistor 35 and outputting a detection voltage VCS. The sensing resistor 35 and the amplifier 36 form a sensing circuit 37 which is part of a current stabilization ring, discussed later on.

In the Buck operating mode, the second half-bridge 5 does not switch; in particular, the second HSS 13 is always on and the second LSS 14 is always off. The first HSS 11 and the first LSS 12 switch in opposite ways, and receive respectively the first switching signal TON and the second switching signal TOFF, shown in FIG. 3.

The voltage regulator 1' of FIG. 2 is configured to work with input voltages Vi greater than the output voltage Vo.

With reference also to FIG. 3, and neglecting for the moment the action of the stabilization ring, the Buck modulator 33 generates the first switching signal TON so that it is high when the voltage control signal VC is greater than the triangular signal TR and low when the voltage control signal VC is lower than the triangular signal TR (see the first two control cycles of FIG. 3, between time instants t1 and t4).

In particular, as also shown in FIG. 4, in the time interval between t1 and t2, voltage control signal VC is higher than triangular signal TR, the first switching signal TON is 1 and the second switching signal TOFF is 0. Thus, in the switching circuit 2, the first HSS 11 is turned on, the first LSS 12 is turned off, and the current flows in the first HSS 11, in the inductor 15 and in the second HSS 13, as shown by a dashed line in FIG. 4. Since the voltage on the inductor 15 is positive and equal to (Vi−Vo), the current $I_L$ in the inductor 15 grows linearly with slope (Vi−Vo)/L (with L being the inductance of the inductor 15).

At time t2, the first and second switching signals TON, TOFF switch; the first HSS 11 turns off, the first LSS 12 turns on, and the inductor current flows in the first LSS 12, in the inductor 15 and in the second HSS 13, as shown by a dash-and-dot line in FIG. 4. In the time interval between t2 and t3, since the voltage on inductor 15 is negative and equal to −Vo, the inductor current $I_L$ through inductor 15 decreases linearly with slope −Vo/L.

At time t3, the voltage regulator 1' switches again and, in the time interval t3-t4, the switching circuit 2 behaves as described above for the time interval t1-t2. In this case, since the voltage control signal VC is higher, time interval t3-t4 is longer than time interval t1-t2 (the duty cycle thus increases).

In case of substantial stability of the output voltage Vo, the voltage regulator 1' thus modifies the on-off time of the switches 11-14 to maintain the output voltage Vo near a desired value.

In the voltage regulator 1', the sensing resistor 35 detects the current $I_L$ in the inductor 15 and, through the amplifier 36, supplies detection voltage VCS to the Buck modulator 33. As long as the detection voltage VCS is lower than a threshold value, the stabilization ring does not intervene. Upon the detection voltage VCS exceeding a threshold value (e.g., due to significant variations of the output current, for example for variations in the load), the Buck modulator 33 injects an additional boosting voltage ($V_{ADD}$) into the triangular signal TR, generating a modified triangular signal TR', which is compared with the voltage control signal VC. For example, $V_{ADD}$=–$kV_{CS}$, wherein k is a constant and $V_{CS}$ is the voltage detected by the sensing circuit 37. In practice, the modified triangular signal TR' is shifted upwards with respect to the triangular signal TR and causes the following time interval t5-t6 (when the first switching signal TON is high) to shorten, allowing the switching circuit 2 to return to a stable condition more quickly.

With the Buck regulation of FIGS. 2-4, detection of the inductor current $I_L$ takes place at the valley points of the triangular signals TR and TR' (time instants t1, t3, etc.), when it flows from the ground 8 through the sensing resistor 35.

The voltage regulator 1' has a duty cycle $V_O$/Vi given by equation (1):

$$\frac{V_O}{V_{in}} = \frac{\Delta T_{ON}}{T} = D_{BUCK} \qquad (1)$$

wherein $\Delta T_{ON}$ is the time the signal TON is high in the period T.

Figure 5:
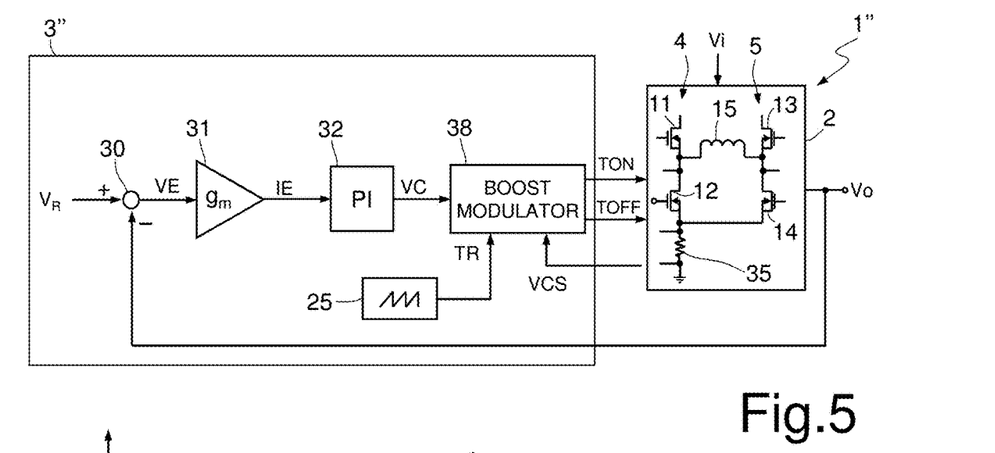
FIG. 5 is a circuit diagram of a Boost voltage regulator.
Figure 6:
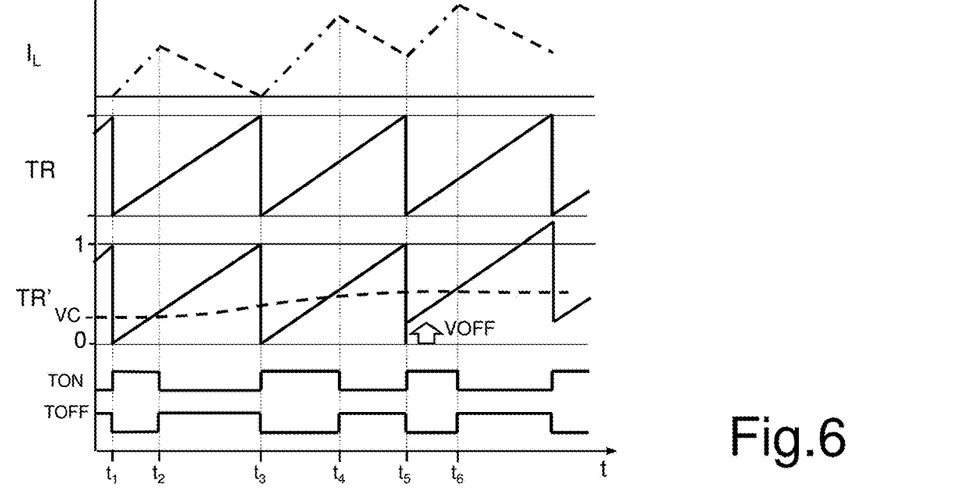
FIG. 6 shows the plot of some electrical quantities in the circuit of FIG. 5.
Figure 7:
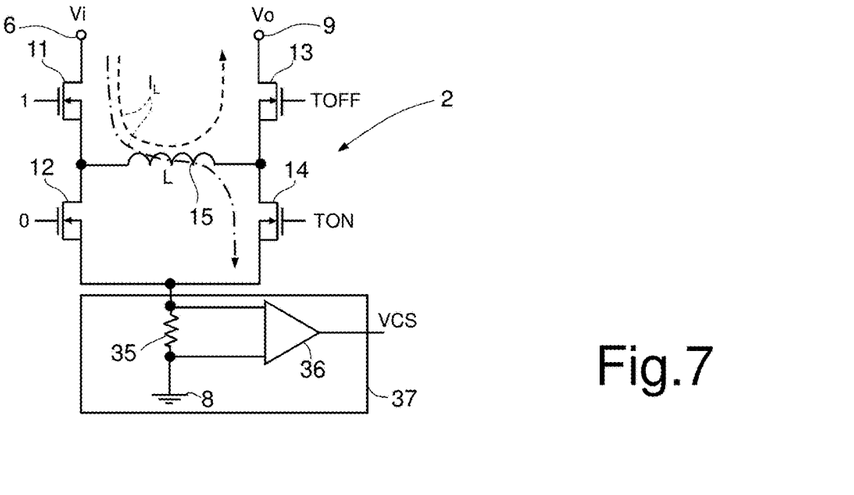
FIG. 7 shows the current flow in the switching circuit for the Boost regulator of FIG. 5.

FIGS. 5, 6, 7 refer to a Boost type control.

The voltage regulator of FIG. 6 (indicated by 1") has a structure very similar to the voltage regulator 10 of FIG. 2, but for the Buck modulator 33 replaced by a Boost modulator 38. The other components have therefore been identified with the same reference numbers and will not be described further.

In the Boost operating mode, the first half-bridge 4 does not switch; in particular, the first HSS 11 is always on and the first LSS 12 is always off. The second HSS 13 and the second LSS 14 switch in the opposite ways, and receive the first switching signal TON and, respectively, the second switching signal TOFF shown in FIG. 6.

The control device 3" of FIG. 2 is configured to work with an input voltage Vi that is lower than the output voltage Vo and operates in a similar way to the voltage regulator 10, as seen from the plot of the main electrical quantities shown in FIG. 6.

In particular, the voltage control signal VC is compared with the modified triangular signal TR' to generate the first and second switching signals TON, TOFF supplied to the second LSS 14 and, respectively, to the second HSS 13.

In the time interval t1-t2, the second HSS 13 is off, the second LSS 14 is on, and the current flows into the first HSS 11, in the inductor 15 and in the second LSS 14, as shown by a dash-and-dot line in FIG. 7. Therefore, the voltage on the inductor 15 is positive (equal to Vi), the current $I_L$ in the inductor 15 grows linearly with slope Vi/L.

At time instant t2, the first and second switching signals TON, TOFF switch; the second HSS 13 turns on, the second LSS 14 turns off, and the current flows in the first HSS 11, in the inductor 15 and in the second HSS 13, as shown by dash line in FIG. 7, similarly to the time interval t1-t2 of FIGS. 3 and 4. In the time interval t2-t3, since the voltage on inductor 15 is negative and equal to Vi–Vo, the current in inductor 15 decreases linearly with slope (Vi–Vo)/L.

The control device 3" then modifies the switching duration of the switches 11-14 to maintain the output voltage Vo near a desired value.

Similarly to the above, the detection circuit 37 detects the current $I_L$ in the inductor 15 and supplies the detection voltage $V_{CS}$ to the Boost modulator 38. When the detection voltage $V_{CS}$ in the inductor 15 exceeds a threshold value, the Boost modulator 38 injects an additional boosting voltage ($V_{ADD}$) in the triangular signal TR, generating the modified triangular signal TR'. For example, $V_{ADD}$=$kV_{CS}$, wherein k is constant and $V_{CS}$ is the voltage measured by the detection circuit 37. Also in this case, in practice, after the intervention of the current stabilization ring, the modified triangular signal TR' is shifted upwards with respect to the triangular signal TR and allows the switching circuit 2 to return to a stable condition more rapidly.

With the Boost adjustment of FIGS. 5-7, detection of the current $I_L$ in the inductor 15 takes place at the peak points of the triangular signals TR and TR' (time instants t2, t4, etc.), when the inductor current $I_L$ flows through the sensing resistor 35 towards ground 8.

The voltage regulator 1" has a duty cycle $V_O$/Vi given by equation (2):

$$\frac{V_O}{V_{in}} = \frac{T}{\Delta T_{OFF}} = \frac{1}{1 - D_{BOOST}} \qquad (2)$$

wherein $\Delta T_{OFF}$ is the time the signal TOFF is high in a period T and $D_{BOOST}$ is the duty cycle of the voltage regulator 1".

According to another known solution, the voltage regulator 1 of FIG. 1 may work in Buck-Boost mode to be able to regulate the output voltage when the latter is higher, lower or about the same as the input voltage. In this case, the voltage regulator 1 alternates Buck control cycles with Boost control cycles. To this end, the PWM modulator 23 comprises both a Buck modulator (as the Buck modulator 33 of FIG. 2), and a Boost modulator (as the Boost modulator 38 of FIG. 5). Furthermore, the PWM modulator 23 comprises a selection circuit, not shown, which selectively enables the Buck modulator 33 or the Boost modulator 38 to generate the switching signals TON, TOFF for both half bridges 4, 5, depending on the working phase.

Typically, in a voltage regulator 1 operating in Buck-Boost mode, when the input voltage Vi exceeds the output voltage Vo for a value greater than a first threshold, the Buck modulator 33 is enabled and controls turning on/off of the first half-bridge 4 to regulate the output voltage Vo, as described with reference to FIGS. 2-4; vice versa, when the input voltage Vi is lower than the output voltage Vo by a value greater than a second threshold, the Boost modulator 38 is enabled and controls switching on/off of the second half-bridge 5 to regulate the output voltage Vo, as described with reference to FIGS. 2-4. When the voltage difference between the input voltage Vi and the output voltage Vo is included in a window between the first and second threshold, according to one solution, the Buck modulator 33 and the Boost modulator 38 are alternated at each regulation cycle for turning on/off the four switches 11-14 of the first and second half-bridge 4, 5.

This type of regulation, using two control loops that operate independently and separately and alternate in the way described, involves a quite high ripple in the output voltage, which is not desired.

Figure 8:
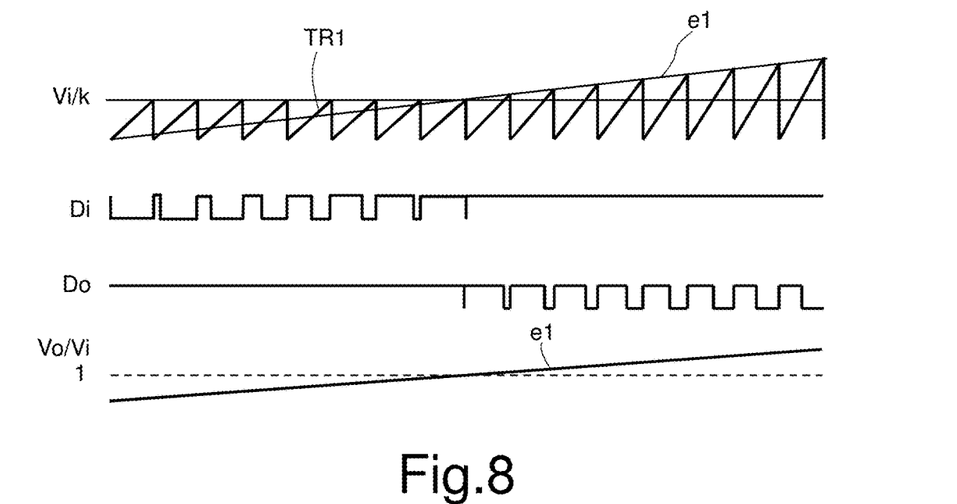
FIG. 8 shows the plot of some electrical quantities in a known Buck-Boost regulator.

Another type of Buck-Boost adjustment is described in EP 1837 983 A1 and gives rise to the waveforms of FIG. 8, wherein Vo/Vi is the ratio between output voltage Vo and input voltage Vi; Vi/k is a partition of the input voltage Vi; Do and Di are the duty cycles of the half-bridges; e is an integrated error at the output of the integrator stage 22 of FIG. 1, resulting by integrating the error between the output voltage Vo and a reference voltage VR (or between values proportional thereto); TR1 is a modified triangular wave, whose maximum value is Vi/k if Vo/Vi<e1, otherwise is e1.

Here, the duty cycles Di, Do of the half-bridges are not the same, but are related to the integrated error e1. In particular, the first duty cycle Di, regulating for example switching of the first half-bridge 4, is proportional to the ratio between the integrated error e1 and the output voltage Vo, and the second duty cycle, regulating, for example, switching of the second half-bridge 5, is proportional to the ratio between the output voltage Vo and the integrated error e1.

This solution, although operating satisfactorily to avoid rapid transients and sudden variations of the output voltage, may nevertheless be improved, above all as regards efficiency and the reduction of the voltage ripple in the transition zone.

Thus, an aim of the invention is to provide a control device for a switching voltage regulator which overcomes the drawbacks of the prior art.

SUMMARY

According to the present invention, there are provided a control device for a switching voltage regulator and a control method, as defined in the attached claims.

In practice, the instant control device uses two separate control loops for regulating operation of the switching circuit half-bridges (Buck half-bridge and Boost half-bridge) in the buck-Boost control mode, each comparing an own reference quantity to a single control quantity. The voltage control loop is unique but based on two separate modulators that operate in a continuous way.

Specifically, the reference quantities, compared to the single control quantity, have the same waveform, in particular triangular or saw-tooth, with the same time period T, same phase and same amplitude range (as a difference between the maximum and minimum values), but shifted to each other. In particular, the Boost mode reference quantity is higher than the Buck mode reference quantity, and the shift value is such as that, when the regulator works in the Buck control mode, the Boost mode reference quantity is always greater than the single comparison quantity; when the regulator works in the Boost control mode, the Buck mode reference quantity is always lower than the single comparison quantity; and in the Buck-Boost control mode, both Buck and Boost mode reference quantities cross the single comparison quantity line.

BRIEF DESCRIPTION OF THE DRAWINGS

For the understanding of the present invention, embodiments thereof are now described, purely as a non-limitative example, with reference to the enclosed drawings, wherein.

DETAILED DESCRIPTION OF ILLUSTRATIVE EMBODIMENTS

Figure 9:
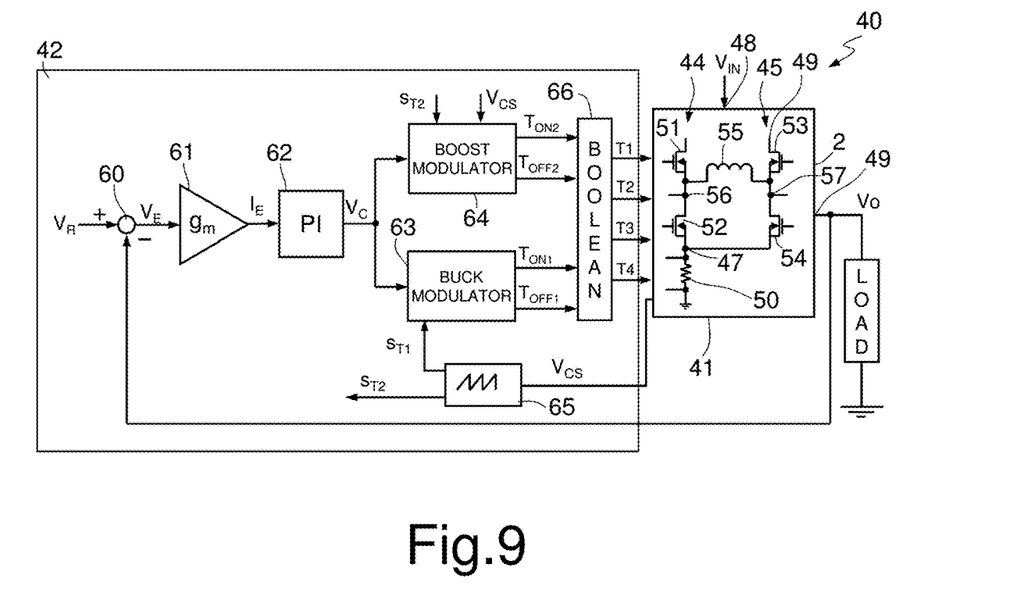
FIG. 9 is a schematic circuit diagram of the present voltage regulator.
Figure 10:
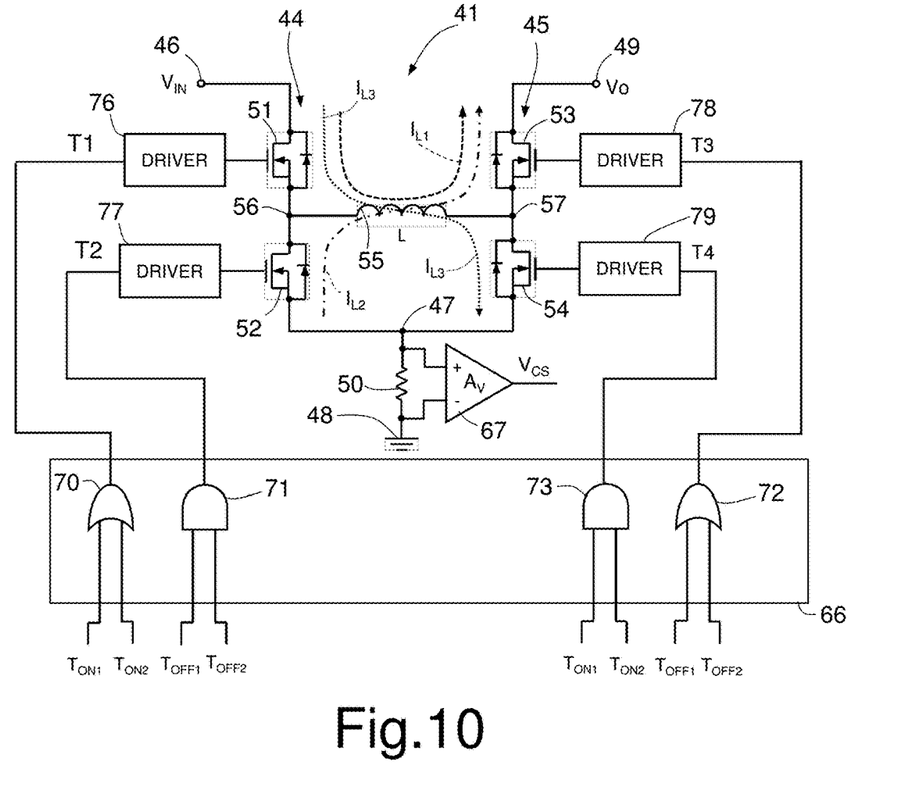
FIG. 10 is a circuit diagram of a portion of the regulator of FIG. 9.

FIGS. 9 and 10 show an embodiment of a voltage regulator 40 of the Buck-Boost type.

The voltage regulator 40 comprises a switching circuit 41 and a control device 42. The switching circuit 41 and the control device 42 are generally formed on separate chips, but could be integrated on a same chip.

The switching circuit 41 (see in particular FIG. 10) is formed by first and second half-bridges 44, 45.

The first half-bridge 44 is formed by a first high side switch (first HSS 51) and a first low side switch (first LSS 52), coupled in series to each other between an input terminal 46 and a common node 47. An input voltage Vi (referred to a reference potential line (ground) 48 is applied at the input terminal 46; common node 47 is coupled to ground 48 through a sensing resistor 50.

The second half-bridge 45 is formed by a second high side switch (second HSS 53) and a second low side switch (second LSS 54), coupled in series to each other between an output node 49 and the common node 47. First and second HSSes 51, 53 and first and second LSSes 52, 54 may be implemented as power MOS devices, e.g., by N-channel power MOS transistors.

The output node 49 supplies an output voltage Vo, referred to ground and supplied to a load 58.

An inductor 55 is coupled between the intermediate nodes 56 and 57 of the first and second half-bridge 44, 45.

The control device 42 (see FIG. 9) comprises a subtracting node 60 receiving a reference voltage VR on a non-inverting input and the output voltage Vo on an inverting input and outputs an error voltage signal VE. The output of the subtracting node 60 is coupled to a transconductance amplifier 61 which generates an error current $IE=g_m \cdot VE$, supplied to a controller 62, here of the proportional-integral type, generating an integrated error signal (hereinafter, also called control signal $V_C$).

The output of the controller 62 is coupled to respective inputs of a Buck modulator 63 and a Boost modulator 64, configured to receive the control signal $V_C$, a first and second triangular (saw-tooth) signals $s_{T1}$ and $s_{T2}$ generated by a triangular signal generator 65. Specifically, as explained in detail below with reference to FIG. 11, Buck modulator 63 receives the control signal $V_C$ and the first triangular signal $s_T$, and generates first and second timing signals $T_{ON1}$ and $T_{OFF1}$; Boost modulator 64 receives the control signal $V_C$ and the second triangular signal $s_{T2}$, and generates third and fourth timing signals $T_{ON2}$ and $T_{OFF2}$.

The triangular signal generator 65 has an input coupled to sensing resistor 50 through an operational amplifier 67 (see FIG. 10) for implementing injection of an additional boosting voltage, as explained hereinafter.

Figure 11:
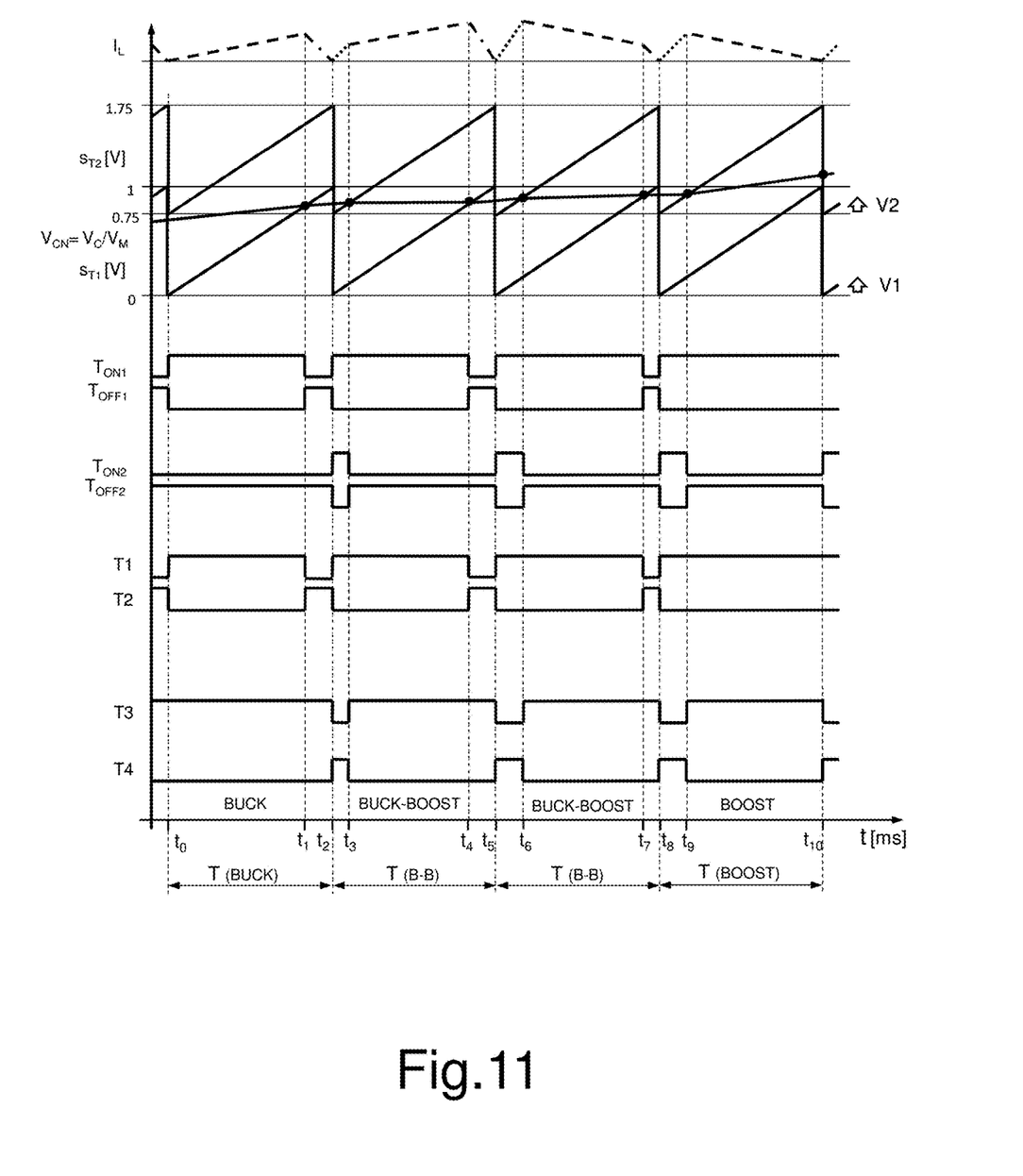
FIG. 11 show the plot of control signals the switching circuit of FIG. 9.

The first and second triangular signals $s_{T1}$ and $s_{T2}$ have a same period T, constant minimum and maximum values, a same amplitude range (here, 1V) but second triangular signal $s_{T2}$ is upwardly shifted with respect to first triangular signal $s_{T1}$ by an offset voltage VOFF; in particular, as shown in FIG. 11, offset voltage VOFF is 0.75 V; the first triangular signal $s_{T1}$ varies between 0 V and 1V and the second triangular signal $s_{T2}$ varies between 0.75 V and 1.75 V.

The timing signals $T_{ON1}$, $T_{OFF1}$, $T_{ON2}$ and $T_{OFF2}$ are supplied to a Boolean circuit 66 to generate first, second, third and fourth drive signals T1-T4 for driving the switches 51-54, through own driving elements 76-79 (FIG. 10).

In particular, as shown in FIG. 10, Boolean circuit 66 comprises a first OR gate 70, a first AND gate 71, a second OR gate 72 and a second AND gate 73.

The first OR gate 70 receives the first and third timing signals $T_{ON1}$, $T_{ON2}$ and generates the first driving signal T1 for the first HSS 51; the first AND gate 71 receives the second and fourth timing signals $T_{OFF1}$, $T_{OFF2}$ and generates the second driving signal T2 for the first LSS 52; the second OR gate 72 receives the second and fourth timing signals $T_{OFF1}$, $T_{OFF2}$ and generates the third driving signal T3 for the second HSS 53; and the second AND gate 73 receives the first and third timing signals $T_{ON1}$, $T_{ON2}$ and generates the fourth control signal T4 for the second LSS 54.

Operation of the voltage regulator 40 will now be described with reference to FIGS. 10 and 11 showing the behavior of the regulator 40 when the output voltage, initially at a lower value than the input voltage Vi, increases for any reasons, thereby causing the regulator 40 to pass from a Buck control mode to a Boost control mode through a Buck-Boost control mode.

In particular, FIG. 11 shows the plots of:
the current $I_L$ through the inductor 55;
the first and second triangular signals $s_{T1}$ and $s_{T2}$. As may be seen, the second triangular signal $s_{T2}$ is higher than the first triangular signal $s_{T1}$, but its minimum value is lower than the maximum value of the first triangular signal $s_T$;
normalized control signal $V_{CN}=V_C/V_M$, obtained by dividing the control signal $V_C$ by the maximum value $V_M$ of the output voltage Vo;
first to fourth timing signals $T_{ON1}$, $T_{OFF1}$, $T_{ON2}$, $T_{OFF2}$; and
first to fourth driving signals T1-T4.

In FIG. 11, before time to, the regulator 40 is in the Buck control mode; thus the third and fourth timing signals $T_{ON2}$, $T_{OFF2}$ are low, respectively high and do not change state, and the first and second timing signals $T_{ON1}$ and $T_{OFF1}$ switch between the high and the low states, in opposite ways.

At time t0, the first and second triangular signals $s_{T1}$ and $s_{T2}$ are at their respective lowest values that are lower and, respectively, higher than normalized control signal $V_{CN}$; therefore first and fourth timing signals $T_{ON1}$ and $T_{OFF2}$ are high, second and third timing signals $T_{OFF1}$, $T_{ON2}$ are low; first and third driving signals T1 and T3 are high, turning on the first and the second HSSes 51 and 53; second and fourth driving signals T2 and T4 are low, turning off the first and the second LSSes 52 and 54. Thus, control is still in Buck mode and inductor current $I_L$, flowing from the input terminal 46 through the first and second HSSes 51 and 53 and inductor 55 toward the output node 49 (as shown in FIG. 10 by dashed arrow $I_{L1}$), increases linearly, with slope (Vi−VO)/L.

At time t1, the first triangular signal $s_{T1}$ reaches and then exceeds normalized control signal $V_{CN}$. Therefore the first timing signal $T_{ON1}$ switches to low, the second timing signal $T_{OFF1}$ switches to high, while the third and fourth timing signals $T_{ON2}$, $T_{OFF2}$ do not change states. Thus, the first and second driving signals T1 and T2 switch to low and, respectively, to high, turning off the first HSS 51 and turning on the first LSS 52, while the third and the fourth driving signals T3 and T4 do not change state and maintain the second HSS 53 on and the second LSS 54 off. Thus, inductor current $I_L$ flows from ground through the first LSS 52, the inductor 55 and the second HSS 53 toward the output node 49 (as shown in FIG. 10 by dash-and-dot arrow $I_{L2}$) and decreases linearly, with slope −VO/L.

At time t2, the first and second triangular signals $s_{T1}$ and $s_{T2}$ reach again their respective lowest values. This time, due to the increase of the normalized control signal $V_{CN}$, both triangular signals $s_{T1}$ and $s_{T2}$ become lower than the normalized control signal $V_{CN}$, causing switching of the first timing signal $T_{ON1}$ to high, of the second timing signal $T_{OFF1}$ to low, of the third timing signals $T_{ON2}$ to high and of the fourth timing signal $T_{OFF2}$ to low. Thus, the regulator 40 enters a Boost phase of a Buck-Boost mode, the first and fourth driving signals T1 and T4 switch to high and the second and third driving signals T2 and T3 switch to low, turning on the first HSS 51 and the fourth LS 54, and turning off the first LS 52 and the second HSS 53. Thus, inductor current $I_L$ flows from the input terminal 46 through the first HSS 51, the fourth LS switch 54 and the inductor 55 toward ground 48 (as shown in FIG. 10 by arrow $I_{L3}$) and increases linearly, with slope Vi/L.

At time t3, the second triangular signal $s_{T2}$ becomes higher than normalized control signal $V_{CN}$ but the first triangular signal $s_{T1}$ remains lower. Thus, the first timing signal $T_{ON1}$ remains high, the second timing signal TOFF remains low, the third timing signal $T_{ON2}$ switches to low and the fourth timing signal $T_{OFF2}$ switches to high. Therefore, first and second driving signal T1 and T2 remain high, respectively low; the third driving signal T3 switches to high, turning on the first HSS 53; and the fourth driving signal T4 switches to low, turning off the second LS switch 54. Here, the regulator 40 is in the Buck-Boost control mode, and inductor current $I_L$, flowing from the input terminal 46 through the first and second HSSes 51 and 53 and inductor 55 toward the output node 49 (as shown in FIG. 10 again by arrow $I_{L1}$), increases linearly, with slope (Vi−Vo)/L, which is smaller than in time interval t0-t1 since the output voltage Vo is higher.

At time t4, the first triangular signal $s_{T1}$ reaches and then exceeds normalized control signal $V_{CN}$, similarly to time t1. Therefore the first and second timing signals $T_{ON1}$ and $T_{OFF1}$ as well as the first and second driving signals T1 and T2 switch, turning off the first HSS 51 and turning on the first LSS 52. The second HSS 53 remains on and the second LS switch 54 remains off. Here, the regulator 40 enters a Buck phase of the Buck-Boost control mode and inductor current $I_L$ flows again from ground toward the output node 49 (arrow $I_{L2}$) and decreases linearly, with slope –VO/L.

At time t5, the first and second triangular signals $s_{T1}$ and $s_{T2}$ reach again their respective lowest values and become lower than the normalized control signal $V_{CN}$. Analogously to time t2, all timing signals $T_{ON1}$, $T_{OFF1}$, $T_{ON2}$ and $T_{OFF2}$ switch, as well as all the driving signals T1 to T4, turning on the first HSS 51 and the fourth LS 54, and turning off the first LS 52 and the second HSS 53. Thus, inductor current $I_L$ flows from the input terminal 46 toward ground 48 (as shown in FIG. 10 again by arrow $I_{L3}$) and increases linearly, with slope Vi/L, due to the change in the inductor biasing. The regulator 40 enters the Boost phase of the Buck-Boost control mode. As may be seen, in this regulation cycle, between times t2 and t5, the inductor current $I_L$ has a trapezoidal waveform.

In the following regulation cycle, between time t5 and time t8, regulator 40 behaves as in the cycle between times t2 and t5, in the Buck-Boost control mode. Here, differently from the cycle between times t2 and t5, the inductor current $I_L$, after increasing with slope Vi/L, decreases (instead of increasing) with slope (Vi–VO)/L since the output voltage VO is now higher than the input voltage Vi. Anyhow, also in this regulation cycle, the inductor current $I_L$ has a trapezoidal behavior, although with different slopes.

At time t8, the regulator 40 switches as described for times t2 and t5, but it passes to a Boost type control mode. In particular, at time t8 all timing signals $T_{ON1}$, $T_{OFF1}$, $T_{ON2}$ and $T_{OFF2}$ switch, as well as all the driving signals T1 to T4, turning on the first HSS 51 and the fourth LS 54, and turning off the first LS 52 and the second HSS 53. The inductor current $I_L$ thus increases again (arrow $I_{L3}$ in FIG. 10). Thereafter, the first triangular signal $s_{T1}$ no more reaches the normalized control signal $V_{CN}$, so that, in this regulation cycle, between t8 and t10, the inductor current $I_L$ has only one increasing portion, between t8 and t9, and one decreasing portion, between t9 and t10, with the first timing signal $T_{ON1}$ and the first driving signal T1 steady in high state; the second timing signal $T_{OFF1}$ and the second driving signal $T_{OFF1}$ steady in low state, the third timing signal $T_{ON2}$, the fourth timing signal $T_{OFF2}$, the third driving signal T3 and the fourth driving signal $T_{OFF1}$ switching between low and high, to maintain the first HSS 51 on, the first LSS 52 off, the second HS switch 54 and the second LS switch 54 alternately turning on and off, according to the Boost control mode.

FIG. 11 also indicates with arrows V1 and V2 the additional boosting voltages that may be added to the first and second triangular signals $s_{T1}$, $s_{T2}$ for speeding transition to a steady state, as discussed in detail above with reference to FIGS. 3 and 6 and explained hereinafter. In particular, the additional boosting voltages V1 and V2 are obtained using a current control loop detecting the inductor current flowing in the switching circuit 41. According to one aspect of the present disclosure, the current control loop may be integrated in the voltage control loop that controls the output voltage of the switching circuit 41.

Figure 12:
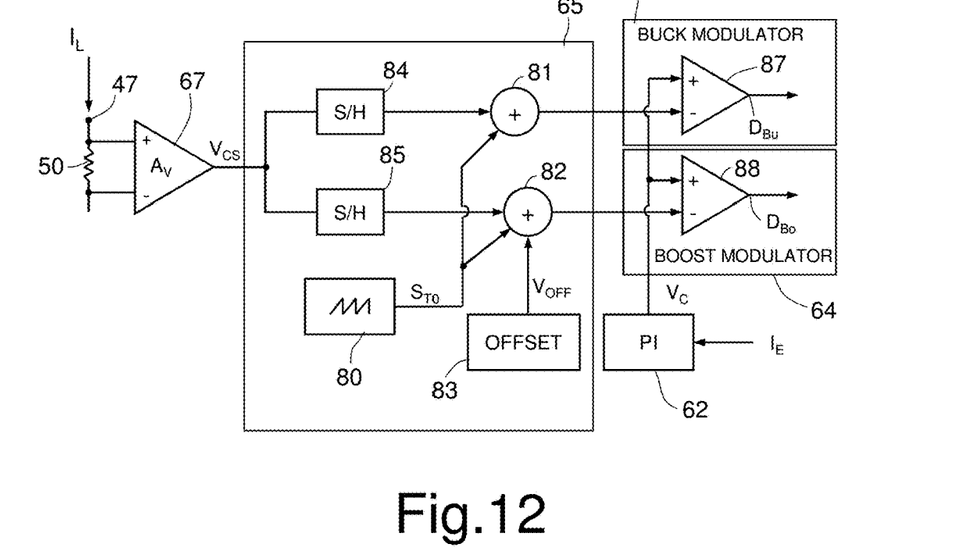
FIG. 12 shows a circuit diagram of another portion of the regulator of FIG. 9.

FIG. 12 show a possible implementation of a circuit implementing the current control loop and generating the additional boosting voltages V1 and V2.

In detail, according to FIG. 12, the triangular signal generator 65 comprises a ramp generator 80 generating a ramp signal $s_{T0}$ supplied to a Buck adding node 81 and to a Boost adding node 82. The Boost adding node 82 also receives the offset voltage VOFF generated by an offset generator 83, e.g. a memory element set in a device testing stage or a voltage reference.

Buck and Boost adding nodes 81, 82 also receive the output of respective Buck and Boost memory elements 84, 85, for example formed as sample and hold circuits. Buck and Boost memory elements 84, 85 receive the detection voltage $V_{CS}$ generated by the operational amplifier 67 and proportional to the inductor current $I_L$ flowing in the switching circuit 41. In particular, and in a per se known manner, the Buck memory element 84 detects and stores the detection voltage $V_{CS}$ at the valley points of inductor current and Boost memory element 85 detects and stores the detection voltage $V_{CS}$ at the peak points of the inductor current.

The outputs of the Buck and Boost adding nodes 81, 82 are fed to the respective Buck and Boost modulators 63, 64. In particular, the outputs of the Buck and Boost adding nodes 81, 82 are coupled to inverting inputs of respective differential amplifiers 87, 88, each having respective non-inverting inputs coupled to the output of the controller 62 and generating a respective Buck and Boost Duty cycle signal DBu, DBo that are used by the Buck and Boost modulators 63, 64 for generating the timing signals $T_{ON1}$, $T_{OFF1}$, $T_{ON2}$ and $T_{OFF2}$.

In the steady state, the voltage regulator 40 has a duty cycle VO/Vi given by equation (3):

$$\frac{V_O}{V_i} = \frac{\Delta T_{ON1}}{\Delta T_{OFF2}} = \frac{D_{BUCK}}{1 - D_{BOOST}} \quad (3)$$

wherein $\Delta T_{ON1}$ is the time the signal $T_{ON1}$ is high in a period T, $\Delta T_{OFF2}$ is the time the signal $T_{OFF2}$ is high in a period T and $D_{BUCK}$ and $D_{BOOST}$ are the duty cycles values of the Buck and, respectively, Boost control modes of the voltage regulator 40.

Figure 13:
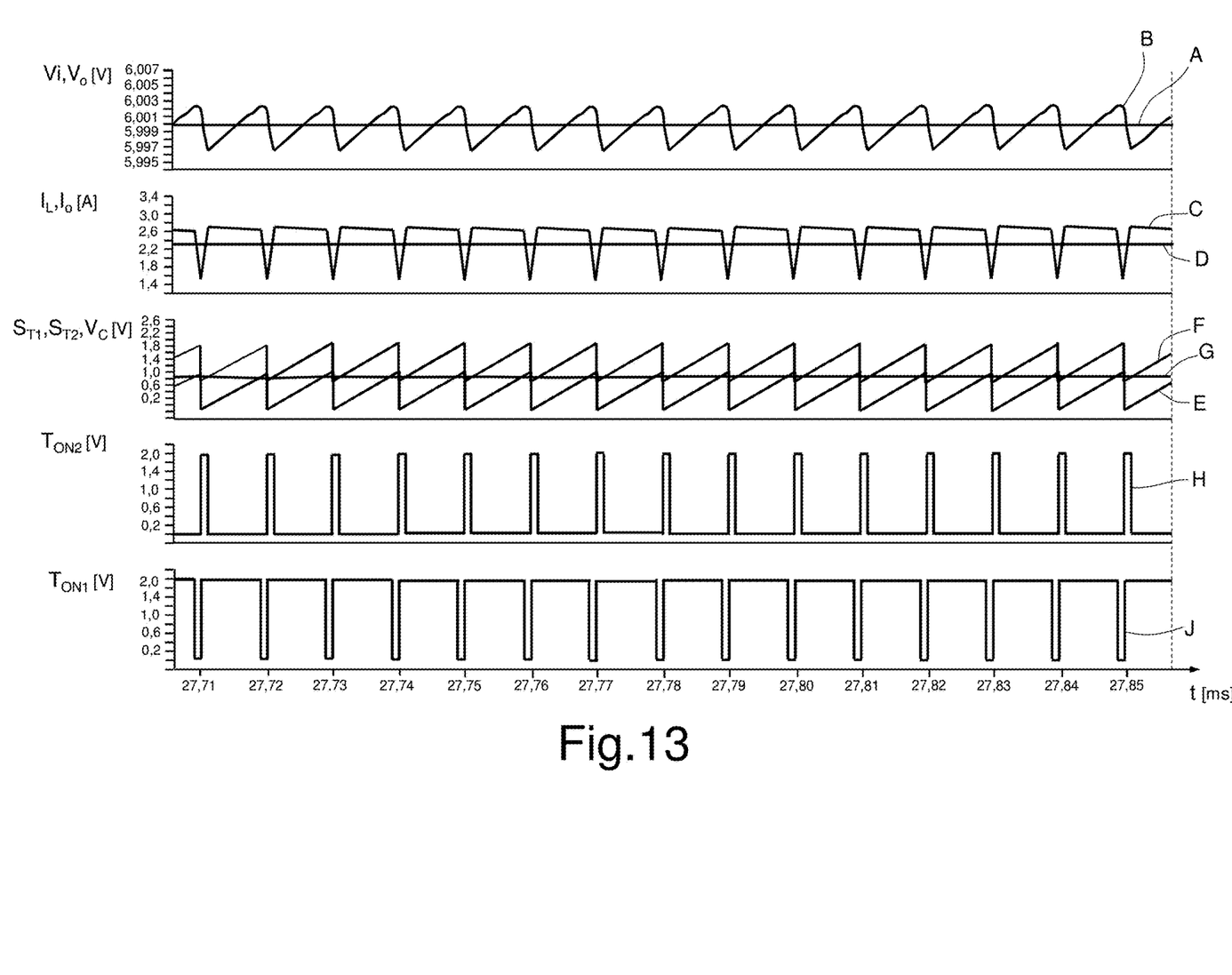
FIG. 13 shows plots of electric electrical quantities measured in the circuit of FIG. 9 in simulations made by the Applicant.

FIG. 13 shows plots of the input voltage Vi (curve A), of the output voltage Vo (curve B), of the inductor current $I_L$ (curve C), of the output current IO flowing in the load 58 (assuming the presence of an output capacitor, not shown, curve D), of the first triangular signal $S_{T1}$ (curve E), of the second triangular signals $S_{T2}$ (curve F), of the control signal $V_C$ (curve G), of the first timing signal $T_{ON1}$ (curve H) and of the second timing signal $T_{ON2}$ (curve J) during the mixed Buck/Boost control mode, wherefrom the above discussed behaviors and in particular the trapezoidal waveform of the inductor current $I_L$ may be seen.

Figure 14:
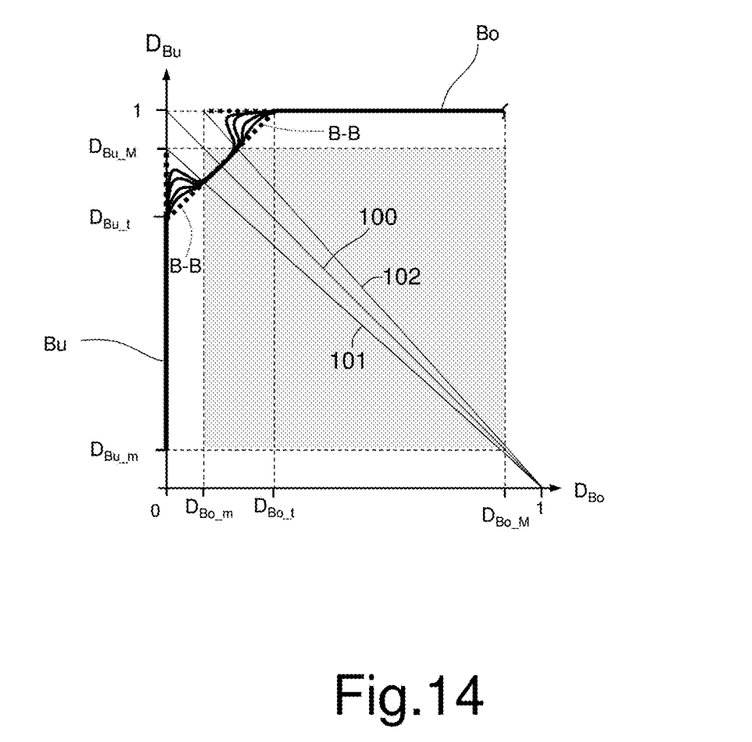
FIG. 14 is a state diagram of the regulator of FIG. 9, showing an ideal behavior and possible real behaviors.

FIG. 14 shows a state diagram of the duty cycle for the regulator 40, with the abscissae showing normalized values for a pure Boost mode control (DBo) and the ordinates showing normalized values for a pure Buck mode control (DBu).

In the diagram of FIG. 14, maximum (DBo_M, DBu_M) and minimum (DBo_m, DBu_m) duty cycles are identified, in order to consider delays involved to turn on and off the switches 51-54 (generally made as power MOS devices), as well as leakage conditions; thus, the square region in light grey indicates the region in which the switches 51-54 are able to be completely ON or OFF. In addition, transition values DBo_t and DBu_t refer to ideal transition values between the pure Boost control mode and pure Buck control mode (or vice versa) to Buck-Boost control mode as discussed above. These ideal values define a straight-portions line, with a vertical portion Bu and a horizontal portion Bo (referring to the pure Buck control mode and the pure Boost control mode, respectively,) and a 45°-inclined portion (B-B, referring to the Buck-Boost control mode).

FIG. 14 also shows the ratio Vo/Vi as a function of the different duty cycles, with the central line 100 corresponding to Vo/Vi=1 and two limit lines 101 and 102 corresponding to DBu_M and DBo_m.

Study by the Applicant have also shown that a straight transition through the Buck-Boost state space is not possible; furthermore a discrete transition between DBo=0 and DBo_m (or DBu=1 and DBu_M) and the transition line is not feasible because of the weak conductivity of power MOS devices even for small turn-on pulses. Thus, a continuous smooth transition in the boundary regions of the state space is expected, as shown by the curves with continuous lines, that are comprised in the triangles formed by line DBo=0 (ordinate axis), the 45°-inclined portion B-B and line 101 and, respectively, the 45°-inclined portion B-B, line 102 and line DBu=1.

By virtue of having a Buck-Boost control mode, controlled by comparing own Buck and Boost reference voltages having the same plot but different values with the same comparison value, related to the output voltage, the present control device is able to reduce the transient time, with lower ripple in the output voltage. The described control circuit is also able to provide larger duty cycle intervals because the control is not based on duty cycle thresholds but is able to work in a continuous manner in the full duty cycle interval.

Finally, it is clear that numerous variations and modifications may be made to the control device and method described and illustrated herein, all falling within the scope of the invention as defined in the attached claims.

For example, the control device 40 may be implemented both in analogous and in digital way, according to the specific design requirements.

In addition, the Boolean circuit 66 may be missing, and the timing signals $T_{ON1}$, $T_{OFF1}$, $T_{ON2}$, $T_{OFF2}$ directly control the drivers 76-79 of the switches 51-54.

What is claimed is:

1. A control device for a switching voltage regulator comprising a switching circuit, the control device comprising: a first input configured to receive a measure signal representative of an output voltage of the switching circuit; an error detector, configured to generate a voltage error signal representative of only a nominal signal minus the measure signal; a proportional-integral (PI) controller, coupled to the error detector and configured to generate a single voltage control signal representative of only an average error of the voltage error signal; a triangular signal generator configured to receive a detection voltage proportional to an inductor current flowing in the switching circuit, and to generate first and second periodic reference signals; a Buck modulator, coupled to the PI controller and configured to compare the single voltage control signal with the first periodic reference signal and to generate at least one first pulse width modulated signal for the switching circuit; and a Boost modulator, coupled to the PI controller and configured to compare the single voltage control signal with the second periodic reference signal and to generate at least one second pulse width modulated signal for the switching circuit; wherein the first and second periodic reference signals have a same period T, same amplitude range, same phase, and different maximum and minimum values; wherein the maximum value of the first periodic reference signal is lower than the single voltage control signal in a Boost control mode; wherein the minimum value of the second periodic reference signal is higher than the single voltage control signal in a Buck control mode; wherein the maximum value of the first periodic reference signal and the minimum value of the second periodic reference signal are higher and lower, respectively, than the single voltage control signal in a transient control mode between the Buck control mode and the Boost control mode; wherein the first pulse width modulated signal switches between on and off control values in the Buck control mode and in the transient control mode; wherein the second pulse width modulated signal switches between the on and off control values in the Boost control mode and in the transient control model wherein a duty cycle of the switching voltage regulator has a Buck-Boost state space comprising: normalized values for a pure Boost mode control in an abscissa line and normalized values for a pure Buck mode control in an ordinate line; a 45°-inclined straight portion line formed by ideal duty cycle transition values between the pure Boost control mode and the pure Buck control mode via a Buck-Boost control mode; and a first straight limit line disposed between a Buck duty cycle maximum and a unity duty cycle for the pure Boost mode control, and a second straight limit line disposed between a Boost duty cycle minimum and the unity duty cycle for the pure Boost mode control and wherein the PI controller is further configured to control a continuous smooth transition along one or more curves within a first triangle formed by the pure Buck mode control abscissa line, the 45°-inclined straight portion line, and the first straight limit line, and within a second triangle formed by the 45°-inclined straight portion line, the second straight limit line, and the pure Boost mode control ordinate line.

2. The control device according to claim 1, wherein the first and second periodic reference signals are triangular saw-tooth signals.

3. The control device according to claim 1, wherein the triangular signal generator comprises:
a ramp generator configured to generate a ramp signal;
an offset generator configured to generate an offset signal;
a Buck adding node coupled to the ramp generator, and configured to generate the first periodic reference signal from the ramp signal and the detection voltage; and
a Boost adding node coupled to the ramp generator and the offset generator, and configured to generate the second periodic reference signal from the offset signal, the ramp signal, and the detection voltage.

4. The control device according to claim 3, further comprising a voltage boosting circuit comprising: first and second memory elements, configured to receive the detection voltage and store a peak value and, respectively, a valley value, representative of current values at a peak point and, respectively, at a valley point of the detection voltage; the Buck adding node, further coupled to the first memory element and the ramp generator; and the Boost adding node, further coupled to the second memory element.

5. The control device according to claim 1, further comprising a Boolean circuit coupled to the Buck and Boost modulators.

6. The control device according to claim 5, wherein the Buck modulator is configured to generate a third pulse width modulated signal, the first and third pulse width modulated signals being opposed to each other, the Boost modulator is configured to generate a fourth pulse width modulated signal, the second and fourth pulse width modulated signals being opposed to each other, and wherein the Boolean circuit comprises first and second OR gates and a first and second AND gates, the first OR gate being configured to receive the first and second pulse width modulated signals and generate a first drive signal; the first AND gate being configured to receive the third and fourth pulse width modulated signals and generate a second drive signal; the second OR gate being configured to receive the third and fourth pulse width modulated signals and generate a third drive signal; and the second AND gate being configured to receive the first and second pulse width modulated signals and generate a fourth drive signal.

7. A switching voltage regulator comprising: a control device comprising: a first input configured to receive a measure signal representative of an output voltage of a switching circuit; an error detector, configured to generate an error signal representative of only a nominal signal minus the measure signal; a proportional-integral (PI) controller, coupled to the error detector and configured to generate a single voltage control signal representative of only an average error of the error signal; a triangular signal generator configured to receive a detection voltage proportional to an inductor current flowing in the switching circuit, and to generate first and second periodic reference signals; a Buck modulator, coupled to the PI controller and configured to compare the single voltage control signal with the first periodic reference signal and to generate at least one first pulse width modulated signal for the switching circuit; and a Boost modulator, coupled to the PI controller and configured to compare the single voltage control signal with the second periodic reference signal and to generate at least one second pulse width modulated signal for the switching circuit; wherein the first and second periodic reference signals have a same period T, same amplitude range, same phase, and different maximum and minimum values; wherein the maximum value of the first periodic reference signal is lower than the single voltage control signal in a Boost control mode; wherein the minimum value of the second periodic reference signal is higher than the single voltage control signal in a Buck control mode; wherein the maximum value of the first periodic reference signal and the minimum value of the second periodic reference signal are higher and lower, respectively, than the single voltage control signal in a transient control mode between the Buck control mode and the Boost control mode; wherein the first pulse width modulated signal switches between on and off control values in the Buck control mode and in the transient control mode; and wherein the second pulse width modulated signal switches between the on and off control values in the Boost control mode and in the transient control mode; and the switching circuit, wherein the switching circuit comprises: a first half-bridge including first and second switches coupled in series between an input node and a reference potential node, wherein the first switch is configured to receive the first pulse width modulated signal, and the second switch is configured to receive a third pulse width modulated signal opposite to the first pulse width modulated signal; a second half-bridge including third and fourth switches coupled in series between an output node and the reference potential node, wherein the third switch is configured to receive the second pulse width modulated signal, and the fourth switch is configured to receive a fourth pulse width modulated signal opposite to the second pulse width modulated signal; an inductive element coupled between intermediate nodes of the first and second half-bridges; wherein a duty cycle of the switching voltage regulator has a Buck-Boost state space comprising: normalized values for a pure Boost mode control in an abscissa line and normalized values for a pure Buck mode control in an ordinate line; a 45°-inclined straight portion line formed by ideal duty cycle transition values between the pure Boost control mode and the pure Buck control mode via a Buck-Boost control mode; and a first straight limit line disposed between a Buck duty cycle maximum and a unity duty cycle for the pure Boost mode control, and a second straight limit line disposed between a Boost duty cycle minimum and the unity duty cycle for the pure Boost mode control; and wherein the PI controller is further configured to control a continuous smooth transition along one or more curves within a first triangle formed by the pure Buck mode control abscissa line, the 45°-inclined straight portion line, and the first straight limit line, and within a second triangle formed by the 45°-inclined straight portion line, the second straight limit line, and the pure Boost mode control ordinate line.

8. The switching voltage regulator according to claim 7, wherein the first and second periodic reference signals are triangular saw-tooth signals.

9. The switching voltage regulator according to claim 7, wherein the triangular signal generator comprises:
a ramp generator configured to generate a ramp signal as the first periodic reference signal;
an offset generator configured to generate an offset signal;
a Buck adding node coupled to the ramp generator, and configured to generate the first periodic reference signal from the ramp signal and the detection voltage; and
a Boost adding node coupled to the ramp generator and the offset generator, and configured to generate the second periodic reference signal from the offset signal, the ramp signal, and the detection voltage.

10. The switching voltage regulator according to claim 9, further comprising a voltage boosting circuit comprising: first and second memory elements, configured to receive the detection voltage and store a peak value and, respectively, a valley value, representative of current values at a peak point and, respectively, at a valley point of the detection voltage; the Buck adding node, further coupled to the first memory element and the ramp generator; and the Boost adding node, further coupled to the second memory element.

11. The switching voltage regulator according to claim 7, further comprising a Boolean circuit coupled to the Buck and Boost modulators.

12. A control method for a switching voltage regulator comprising a switching circuit and a control device, the control method comprising: receiving a measure signal representative of an output voltage of the switching circuit; generating an error signal representative of only a nominal signal minus the measure signal; generating processing the error signal through a proportional-integral (PI) controller to generate a single voltage control signal representative of only an average error of the error signal; receiving a detection voltage proportional to an inductor current flowing in the switching circuit; generating first and second periodic reference signals in accordance with the detection voltage; comparing the single voltage control signal with the first periodic reference signal; generating a first pulse width modulated signal through a Buck modulator; comparing the single voltage control signal with the second periodic reference signal; generating a second pulse width modulated signal through a Boost modulator; the first and second periodic reference signals having a same period, same amplitude range, same phase, and different maximum and minimum values; the maximum value of the first periodic reference signal being lower than the single voltage control signal in a Boost control mode; the minimum value of the second periodic reference signal being higher than the single voltage control signal in a Buck control mode; the maximum value of the first periodic reference signal and the minimum value of the second periodic reference signal being higher and lower, respectively, than the single voltage control signal in a transient control mode between the Buck control mode and the Boost control mode; switching the first pulse width modulated signal between on and off control values in the Buck control mode and in the transient control mode; switching the second pulse width modulated signal between the on and off control values in the Boost control mode and in the transient control mode; a duty cycle of the switching voltage regulator having a Buck-Boost state space comprising: normalized values for a pure Boost mode control in an abscissa line and normalized values for a pure Buck mode control in an ordinate line; a 45°-inclined straight portion line formed by ideal duty cycle transition values between the pure Boost control mode and the pure Buck control mode via a Buck-Boost control mode; and a first straight limit line disposed between a Buck duty cycle maximum and a unity duty cycle for the pure Boost mode control, and a second straight limit line disposed between a Boost duty cycle minimum and the unity duty cycle for the pure Boost mode control; and controlling, by the PI controller, a continuous smooth transition along one or more curves within a first triangle formed by the pure Buck mode control abscissa line, the 45°-inclined straight portion line, and the first straight limit line, and within a second triangle formed by the 45°-inclined straight portion line, the second straight limit line, and the pure Boost mode control ordinate line.

13. The method according to claim 12, further comprising:
generating a ramp signal;
generating an offset signal;
generating the first periodic reference signal by adding the ramp signal and the detection voltage; and
generating the second periodic reference signal by adding the offset signal, the ramp signal, and the detection voltage.

14. The method according to claim 13, further comprising: detecting a peak value and, respectively, valley value, representative of current values at a peak point and, respectively, at a valley point of the detection voltage; storing first and second additional boosting quantities related to the peak and, respectively, valley values; and adding the first and a second additional boosting quantities to the first and, respectively, second periodic reference signals.

15. The method according to claim 12, further comprising flowing a current in the switching circuit, the current having a trapezoidal shape in the transient control mode.

* * * * *